United States Patent [19]

Rifkin

[11] 3,836,896

[45] Sept. 17, 1974

[54] NON-VOLATILE MAGNETIC DOMAIN DEVICE HAVING BINARY VALUED BIAS FIELD EXCITATION

[75] Inventor: Alfred Aaron Rifkin, Wappingers Falls, N.Y.

[73] Assignee: International Business Machines Corporation, Armonk, N.Y.

[22] Filed: June 29, 1972

[21] Appl. No.: 267,295

[52] U.S. Cl. .................. 340/174 TF, 340/174 PM, 340/174 MA

[51] Int. Cl. .......................................... G11c 11/14

[58] Field of Search ................ 340/174 TF, 174 MA

[56] References Cited

UNITED STATES PATENTS

| | | | |
|---|---|---|---|
| 3,631,417 | 12/1971 | Golder et al. | 340/174 MA |
| 3,711,841 | 1/1973 | Geusic et al. | 340/174 TF |

OTHER PUBLICATIONS

Bell Laboratories Record "The Magnetic Bubble" by Bobeck, June/July 1970, pp. 163–169.

*Primary Examiner*—Stanley M. Urynowicz, Jr.
*Attorney, Agent, or Firm*—Robert J. Haase

[57] ABSTRACT

A packaged magnetic domain device provided with a bias magnetic field whose magnitude is adjustable to one of two different values for domain formation and domain erasure, respectively. The domain devices are packaged with a permanent magnet and an electromagnet whose additive magnetic fields constitute the bias field. Additional provision is made in the same package for a pair of orthogonal in-plane switching magnetic fields for domain propagation. Thermocouple means within the package and adjacent the magnetic domain chips monitors chip temperature and produces a proportional signal to control the electromagnet to maintain constant magnetic domain bubble size irrespective of temperature variations.

8 Claims, 3 Drawing Figures

NON-VOLATILE MAGNETIC DOMAIN DEVICE HAVING BINARY VALUED BIAS FIELD EXCITATION

BACKGROUND OF THE INVENTION

1. Field of the Invention

The invention generally relates to magnetic domain device biasing arrangements, and, more particularly, to such an arrangement wherein the amplitude of the bias magnetic field is set at one of two different values during respective operational modes.

2. Description of the Prior Art

As is well understood, magnetic domain devices employing permeable overlay patterns on a ferromagnetic cylindrical domain-supporting film require a bias magnetic field perpendicular to the film and a switching magnetic field whose direction may be switched within the plane of the film for maintaining and for propagating, respectively, the cylindrical magnetic domains. As disclosed in copending U.S. Pat. application Ser. No. 265034, for Packaged Magnetic Device Having Integral Bias and Switching Magnetic Field Means, filed June 21, 1972 in the names of W. E. Bogholtz et al., now abandoned and assigned to the present assignee, the bias magnetic field and the switching magnetic field may be provided together with the magnetic domain devices within a self-contained package. The package includes a permanent magnet for providing the bias magnetic field and a pair of printed circuit coils orthogonally related to each other for providing the in-plane switching magnetic field. The self-contained package is adapted to be plugged into a board or card in combination with other similar packages and may be removed therefrom without loss of magnetic domain data because of the non-volatile characteristic provided by the self-contained permanent bias magnetic field.

In many applications, it is required that the bubble domain data stored in the magnetic domain devices be erased to permit the installation of new data. It is desirable that the erasure be accomplished by means which are compatible with the aforementioned self-contained permanent bias magnetic field. At the same time, it is advantageous to provide for the amplitude variation of the bias magnetic field to stabilize the size of the magnetic domains irrespective of temperature variations.

SUMMARY OF THE INVENTION

A packaged magnetic domain device is provided including a permanent magnet surrounding one or more magnetic domain device chips. The permanent magnet provides a permanent bias of approximately appropriate magnitude for the generation and magnetic field propagation of magnetic domains and to impart a non-volatile characteristic to the data stored in the magnetic domain device chips. An electromagnet coil is positioned adjacent the permanent magnet and oriented to provide a controllable magnetic field along the same axis as the permanent magnetic field. A binary valued current source provides a current that may be set to one of two different amplitudes for application to the electromagnet coil. When one current amplitude is applied to the electromagnet, the total bias field including the permanent magnetic field is set equal to a desired value for the generation and propagation of magnetic domains. The other current amplitude is greater than the first, and when applied to the electromagnet coil, raises the total bias magnetic field to a value causing the collapse of the magnetic domains and the erasure of the data represented thereby.

A thermocouple located within the package adjacent the magnetic domain device chips monitors temperature and provides a current component also applied to the electromagnet coil for varying the amplitude of the bias magnetic field in a predetermined relationship with temperature to maintain constant the size of the magnetic domains despite temperature variations. The switching magnetic field windings and the bias magnetic field electromagnet coil are connected to respective pins extending from the self-contained package for conveniently connecting and disconnecting the magnetic domain devices in a given package with those in other similar packages in desired card and board configurations. The permanent magnet portion of the bias magnetic field preserves data non-volatility within any disconnected package.

DESCRIPTION OF THE PREFERRED EMBODIMENTS

Figure 1:
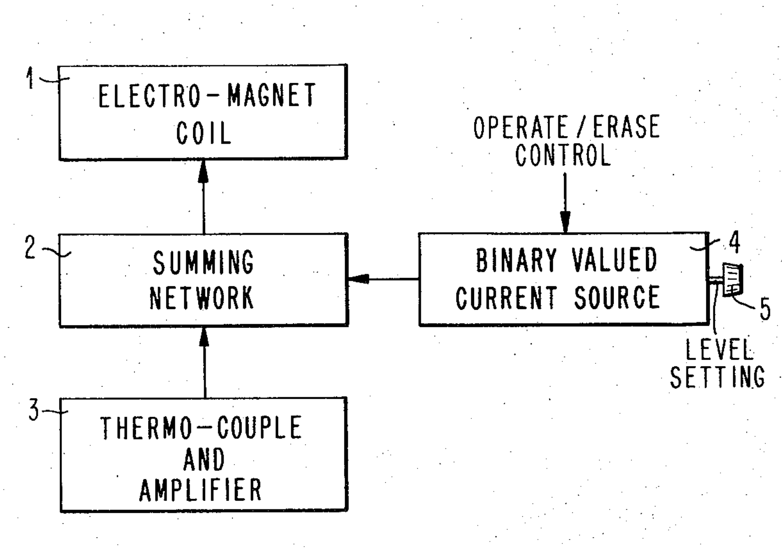
FIG. 1 is a simplified block diagram of the excitation means of the electromagnet coil providing a portion of the bias magnetic field for the magnetic domain device of the present invention.

FIG. 1 represents the general arrangement of the electrical system for exciting the electromagnet coil which contributes to the total bias magnetic field for the magnetic field domain device chips (not shown). Electromagnet coil 1 is energized by the output current from summing network 2 to which are applied two constituent currents. One of the constituent currents is derived from thermocouple and amplifier 3 and the other is provided by the binary valued current source 4. As will be explained more fully with reference to FIG. 2, thermocouple 3 is located adjacent the magnet domain device chips (which receive the bias magnetic field component provided by electromagnet 1) and provides an output current which varies as a known function of the temperature sensed by thermocouple 3 so as to provide a magnetic field component for maintaining magnetic domain bubble size constant independent of temperature variations.

The manner in which magnetic domain bubble size varies as a function of temperature and the compensating variation in the amplitude of the bias magnetic field required to maintain bubble diameter at a desired fixed value despite temperature variations is readily ascertainable by experiment. In general, there is a non-linear relationship between magnetic field density and temperature for maintaining a given magnetic bubble diameter which depends upon the nature of the magnetic domain garnet material exployed and the structural design of the packaged magnetic domain chip device. A typical structural design will be discussed later with reference to FIGS. 2 and 3. In any event, once the non-linear relationship is determined experimentally, it is readily taken into account in the transfer function design of amplifier 3.

Binary valued current source 4 receives an input signal designed "operate/erase control" from the computer serviced by the magnetic bubble domain device of the present invention or from a manually operated control panel. The operate/erase control signal determines which of the two binary valued current amplitudes is to be provided by source 4 to summing network 2. One of the values, when added to the permanent magnetic field of the permanent magnet to be described with reference to FIG. 3, produces a resultant field of appropriate magnitude for the formation and propagation of the magnetic domains. The other of the binary valued current amplitudes increases the strength of the magnetic field provided by electromagnet coil 1 so that the total field, including the permanent magnet field, is sufficient to cause the collapse of the magnetic domains and, hence, the erasure of the data represented thereby. Current source 4 is provided with a level setting control 5 for setting the "operate" binary current value to take into account manufacturing tolerance variations in the strength of the magnetic field provided by the permanent magnet so that the total bias magnetic field amplitude may be set accurately to the desired amount without requiring any selection of the permanent magnets for a given magnetic domain device package. It will be noted that one of the binary values of current provided by source 4 might be zero in the event that a given permanent magnet provides by itself the desired total bias magnetic field for magnetic domain generation and propagation.

Figure 2:
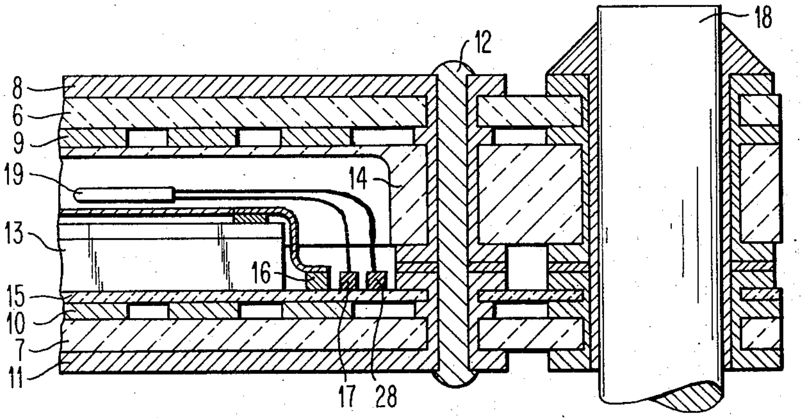
FIG. 2 is a typical cross sectional view of a portion of a magnetic domain device assembly in accordance with the present invention showing the thermocouple represented in FIG. 1.

The magnetic domain device assembly represented in the typical cross sectional view of FIG. 2 is described in detail in the aforementioned copending patent application. Briefly, conductively clad insulating substrates 6 and 7 are etched to provide conductive stripe patterns on the respective opposing surfaces 8 and 9 and on the respective opposing surfaces 10 and 11. Striped conductive patterns 8 and 11 run in the same direction which is parallel to the plane of the drawing in the view of FIG. 2. Striped patterns 9 and 10 also run in the same direction relative to each other which direction is perpendicular to the plane of the drawing.

Each end of a given one of stripes 8 is connected to a respective end of a corresponding one of stripes 11 by a solder-filled via hole such as the one represented by the numeral 12. The individual conductors of pattern 9 are similarly connected to respective conductors of pattern 10 by solder-filled via holes (not shown) which are outside the plane of the cross sectional view of FIG. 2. The result of the solder filled via hole connections between striped conductive patterns 8 and 11 and between striped conductive patterns 9 and 10 is a pair of windings orthogonally oriented relative to each other. Upon receiving a suitable sequence of excitations, said coils provide a magnetic field whose direction can be switched within the plane of the magnetic domain device chips such as chip 13 for magnetic domain propagation purposes. Substrate 6 and insulating spacer 14 are fixed together with a suitable heat/pressure bonding material capable of withstanding soldering temperatures. Substrate 7 and insulating layer 15 are similarly heat/pressure bonded together. Layer 15 initially is provided with a conductive cladding and is selectively etched to provide a printed wiring pattern including conductors 16, 17 and 28 by which electrical connection is established to the magnetic domain device chips such as chip 13 and to thermocouple 19. The patterned conductors of insulating layer 15 including conductors 16, 17 and 28 extend to respective pins such as pin 18 to which external electrical connections may be made as required for the operation of the magnetic domain device chips and thermocouple 19 which is placed adjacent domain device chip 13. Pin 18 of FIG. 2 is not connected to thermocouple 19 or device chip 13 but is utilized merely for assembly support purposes. Other pins, similar to pin 18, provide electrical connection access for the coils formed by conductive layers 8, 9, 10 and 11 and for the thermocouple and magnetic domain device chips represented in FIG. 2. Except for the provision of the thermocouple 19, FIG. 2 corresponds in structure and in operation to the embodiment of FIG. 3 of the aforementioned copending patent application.

Figure 3:
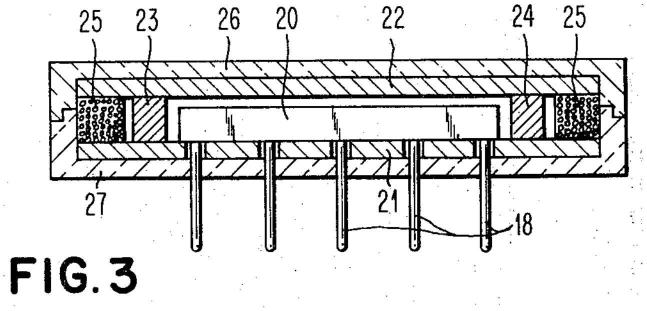
FIG. 3 is a cross sectional view of a packaged magnetic domain device equipped with the permanent magnet and electromagnet bias magnetic field producing means of the present invention.

The assembled unit as shown in FIG. 2 is represented by the reference numeral 20 in FIG. 3. The assembly 20 with its integrally mounted in-plane switching magnetic field coils and magnetic domain device chips is fixed to and supported by permalloy sheet 21 which is apertured to permit penetration of pins 18 without establishing electrical contact with pins 18. Permalloy sheet 22, together with permalloy sheet 21 uniformly distribute the total bias magnetic field with respect to assembly 20. The total bias magnetic field comprises a permanent magnetic field component provided by permanent bar magnets 23 and 24 and an alternate magnetic field component provided by electromagnet coil 25. The total bias magnetic field so formed is in a direction perpendicular to the plane of the magnetic domain device chips within the assembly 20. The package is completed by a split outer case of a suitable material such as plastic whose halves 26 and 27 are snap-fitted together permitting easy access to the interior components for repair purposes.

The permanent bias magnetic field component provided by magnets 23 and 24 and permalloy sheets 21 and 22 impart a non-volatile characteristic to the magnetic domain data present in the magnetic domain device chips of assembly 20. Assuming, for example, that the magnetic domain device chips provide data memory in a computer, the total package of FIG. 3 may be unplugged, picked up and transported to another memory location or stored without loss of data. However, stored data may be erased when desired by the application of an erase control signal to current source 4 of FIG. 1 which increases the current magnitude applied to electromagnet coil 1 (corresponding to electromagnet coil 25 of FIG. 3) to a value causing the collapse of all magnetic domains then present in the magnetic domain device chips. Upon termination of the erase control signal and the restoration of the operate control signal to current source 4, the bias magnetic field magnitude is reduced to an amount permitting the generation and the propagation of new magnetic domains as desired.

A single package containing magnetic domain devices in accordance with the present invention may provide sufficient bit storage capacity for some computer applications. In such instances, a single thermocouple 19 located within the package as shown in FIG. 2 provides sufficient temperature sensing capability for varying the current through electromagnet coil 25 of FIG. 3 to maintain constant the size of the magnetic bubbles irrespective of temperature variations. In other computer applications, a plurality of packaged magnetic domain devices may be connected in desired card configurations. Generally, one thermocouple per card is all that is needed for sensing the ambient temperature and for controlling all of the electromagnet coils of all the packaged devices located on a given card. The thermocouple may be located within the package as shown in FIG. 2 or, alternatively, outside the package on the card adjacent the packaged devices. In either case, the thermocouple output signal controls the electromagnet coil current in all the packaged devices.

While this invention has been particularly shown and described with reference to preferred embodiments thereof, it will be understood by those skilled in the art that various changes in form and details may be made therein without departing from the spirit and scope of the invention.

What is claimed is:

1. A magnetic domain device comprising:

a magnetic domain device chip, a permanent magnet surrounding said chip and providing a bias magnetic field along an axis perpendicular to said chip, an electromagnet coil surrounding said chip and adjacent said permanent magnet and oriented to provide when excited a controllable magnetic field along said axis, and a binary valued current source for providing a current of two different amplitudes for application to said coil, said permanent magnet and said coil in response to one of said two different current amplitudes providing a total bias magnet field having a value sustaining the generation and propagation of magnetic domains in said chip and providing a total bias magnetic field in response to the other of said two different current amplitudes having a value causing the collapse of said magnetic domains and precluding the generation and propagation of magnetic domains in said chip.

2. The device defined in claim 1 wherein one of said two different current amplitudes is zero.

3. The device defined in claim 1 and further including means for sensing the temperature of said chip and for providing a signal which is a function of said temperature, and means for applying said signal to said electromagnet coil.

4. The device defined in claim 3 wherein said means for sensing is a thermocouple located adjacent said chip and surrounded by said permanent magnet.

5. The device defined in claim 4 wherein said permanent magnet comprises a pair of permanent bar magnets and a pair of sheets of magnetic material, said chip being located between said bar magnets, and said sheets of magnetic material extending between and across said bar magnets and across said coil, and further including a plurality of conductive pins, said coil and said thermocouple being connected to respective ones of said pins, one of said sheets of magnetic material being apertured to permit penetration by said pins without establishing electrical contact with said pins.

6. The device defined in claim 1 wherein said permanent magnet comprises:

a pair of permanent bar magnets and a pair of sheets of magnetic material, said chip being located between said bar magnets, and said sheets of magnetic material extending between and across said bar magnets and across said coil.

7. The device defined in claim 6 and further including a splitable closed container having engageable mating surfaces for supportably enclosing said bar magnets and said sheets of magnetic materials.

8. The device defined in claim 6 and further including a plurality of conductive pins, said coil being connected to respective ones of said pins, and one of said sheets of magnetic material being apertured to permit penetration by said pins without establishing electrical contact with said pins.

* * * * *